(12) United States Patent
Freed et al.

(10) Patent No.: US 6,691,068 B1
(45) Date of Patent: Feb. 10, 2004

(54) METHODS AND APPARATUS FOR OBTAINING DATA FOR PROCESS OPERATION, OPTIMIZATION, MONITORING, AND CONTROL

(75) Inventors: Mason L. Freed, Walnut Creek, CA (US); Randall S. Mundt, Pleasanton, CA (US); Costas J. Spanos, San Leandro, CA (US)

(73) Assignee: OnWafer Technologies, Inc., Pleasant Hill, CA (US)

( * ) Notice: Subject to any disclaimer, the term of this patent is extended or adjusted under 35 U.S.C. 154(b) by 630 days.

(21) Appl. No.: 09/643,614

(22) Filed: Aug. 22, 2000

(51) Int. Cl.$^7$ .............................................. H01L 21/70
(52) U.S. Cl. ........................................... 702/187; 702/90
(58) Field of Search .......................... 702/64, 130, 141, 702/88, 90, 187, 189

(56) References Cited

U.S. PATENT DOCUMENTS

| | | | |
|---|---|---|---|
| RE32,369 E | | 3/1987 | Stockton et al. ............. 342/368 |
| 4,745,564 A | * | 5/1988 | Tennes et al. ............... 702/141 |
| 4,895,454 A | * | 1/1990 | Kammleiter et al. ........ 374/163 |
| 5,008,843 A | * | 4/1991 | Poelsler et al. ............. 702/104 |
| 5,089,979 A | * | 2/1992 | McEachern et al. .......... 702/91 |
| 5,262,944 A | | 11/1993 | Weisner et al. ........ 364/413.02 |
| 5,300,875 A | * | 4/1994 | Tuttle ......................... 320/138 |
| 5,389,769 A | | 2/1995 | Yamashita et al. .......... 235/375 |
| 5,444,637 A | * | 8/1995 | Smesny et al. ............. 702/127 |
| 5,457,447 A | * | 10/1995 | Ghaem et al. ........... 340/10.42 |
| 5,526,293 A | * | 6/1996 | Mozumder et al. ............ 716/19 |
| 5,625,569 A | * | 4/1997 | Trimmer et al. ............ 700/286 |
| 5,839,094 A | * | 11/1998 | French ......................... 702/91 |
| 5,866,024 A | | 2/1999 | Villeneuve et al. ......... 235/493 |
| 5,907,820 A | | 5/1999 | Pan ............................. 702/155 |
| 5,959,309 A | | 9/1999 | Tsui et al. ..................... 257/48 |
| 5,967,661 A | | 10/1999 | Renken et al. ............. 374/126 |
| 5,969,639 A | | 10/1999 | Lauf et al. ............. 340/870.17 |
| 5,989,349 A | | 11/1999 | Ke et al. ..................... 118/728 |
| 6,014,896 A | * | 1/2000 | Schoess ........................ 73/583 |
| 6,022,794 A | | 2/2000 | Hsu ............................. 438/14 |
| 6,033,922 A | | 3/2000 | Rowland et al. .............. 438/14 |

(List continued on next page.)

FOREIGN PATENT DOCUMENTS

| | | |
|---|---|---|
| DE | 43 27 342 A1 | 2/1995 |
| EP | 0 337 669 A2 | 10/1989 |
| GB | 2 141 365 A | 12/1984 |
| WO | WO 90/05960 | 5/1990 |
| WO | WO 99/31713 | 6/1999 |
| WO | WO 00/02236 | 1/2000 |

OTHER PUBLICATIONS

International PCT Search Report for Application PCT/US 01/26315, Nov. 7, 2002.

(List continued on next page.)

*Primary Examiner*—Marc S. Hoff
*Assistant Examiner*—Craig Steven Miller
(74) *Attorney, Agent, or Firm*—Larry Williams

(57) ABSTRACT

Data are collected for deriving response models and information required for developing and maintaining processes and process tools. Methods and apparatus for collecting the data include a sensor apparatus capable of collecting data with less perturbation and fewer disruptions than is usually possible using standard methods. The sensor apparatus is capable of being loaded into a process tool. From within the process tool, the sensor apparatus is capable of measuring data, processing data, storing data, and transmitting data. The sensor apparatus has capabilities for near real time data collection and communication.

41 Claims, 10 Drawing Sheets

U.S. PATENT DOCUMENTS

| | | | | |
|---|---|---|---|---|
| 6,051,443 | A | | 4/2000 | Ghio et al. .................... 438/17 |
| 6,125,686 | A | * | 10/2000 | Haan et al. ................ 73/12.09 |
| 6,244,121 | B1 | | 6/2001 | Hunter ...................... 73/865.9 |
| 6,275,143 | B1 | * | 8/2001 | Stobbe .................... 340/10.34 |

OTHER PUBLICATIONS

International PCT Search Report PCT/US02/11154 Jun. 27, 2002.

"Autonomous Micro–sensor Arrays for Process Control of Semiconductor Manufacturing Processes," Drian Fisher, Mason Freed, Kameshwar Poolla and C. J. Spanos—U.C. Berkeley, Presented: Proceedings of the 38th Conference on Decision and Control– Dec. 7–10, 1999. Presentation on Dec. 10, 1999.

"Micro–sensor Arrays for Calibration, Control, and Monitoring of Semiconductor Manufacturing Processes," Darin Fisher, Mason Freed, Kameshwar Poolla and C. J. Spanos—U.C. Berkeley. Presented: 1999 IEEE International Conference on Control Applications, Aug. 22–26, 1999. Presentation on Aug. 24, 1999.

Kovacs, G.T.A., Micromachined Transducers Sourcebook, WCB McGraw–Hill, 1998, pp. xv–xvi, 586–587.

Klaassen, E.H., "Thermal AC to RMS Converter", Stanford University Ph.D. Thesis, May 1996, pp. iv–x, 156–162.

* cited by examiner

METHODS AND APPARATUS FOR OBTAINING DATA FOR PROCESS OPERATION, OPTIMIZATION, MONITORING, AND CONTROL

BACKGROUND

This invention relates to improved methods and apparatus for processing workpieces, more particularly, processing workpieces for electronic device fabrication.

The successful processing of materials for electronic devices typically requires optimization and precise control of the processing environment at all process steps. Many of these process steps are performed under conditions that make it difficult or impossible to measure the desired process variables. In those cases where an important process variable cannot be readily measured (e.g. semiconductor wafer temperature during a plasma etch step for an integrated circuit), an attempt is made to correlate the parameter of interest to other measurable or controllable parameters. The accuracy and stability of these correlations, also called equipment response models, are a critical factor in determining the process capability and device yield at any given process step.

An accurate equipment response model for a given process step will typically have both spatial (dependence upon location within the process tool) and temporal (dependence upon process time or sequence) components. In applications such as semiconductor wafer processing, the industry trend toward larger wafers makes it increasingly important that not only the average values but also the distribution and uniformity of critical process parameters be measured. This spatial mapping requirement usually requires distribution of multiple sensors within the processing area; consequently, there may be increased probability of process perturbation and reduced response model quality. Obtaining process time dependent data typically requires in-situ and substantially real time instrumentation and measurement. These measurement techniques often have requirements (e.g. optical access, electrical connections, etc.) that are incompatible with or intrusive to the processing environment and tool configuration.

Obtaining or verifying an equipment response model under these conditions can be difficult, expensive, and problematic. The introduction of potentially perturbing sensor elements and their associated feedthroughs and connections into the process environment (e.g. thermocouples into a plasma discharge) is undertaken with great reluctance. Therefore, most of the intrusive applications are only used by equipment developers and, to a lesser extent, high-end process developers. Even though such applications will clearly benefit high volume production, advance instrumentation and modeling is almost never used in such environments. This is because the danger of process perturbation usually exceeds the potential benefits.

Equipment response models are often highly sensitive to specific process parameters, sometimes in ways that are not readily apparent. For example, in a typical plasma etch system the wafer temperature can be dependent upon the process gas mix and wafer backside roughness as well as the more obvious parameters of chuck temperature, RF power, and backside helium pressure. Equipment response models developed with an incomplete understanding of all interactions or that are made under conditions significantly different from the actual manufacturing conditions can have serious errors. It is unlikely that one could adequately anticipate the final optimum processing conditions and wafer states so as to produce a generally acceptable response model; this is particularly true during the design and development stage when measurements for response models are typically made.

Equipment response models can be highly sensitive to hardware variations such as surface finish on an electrostatic chuck used in semiconductor wafer processing. An attempt to stabilize a response model by specifying tight tolerances on numerous attributes of a component is usually costly and ineffective. Important hardware attributes often undergo a slow change over time, and these changes may be reflected as drift in the form of slowly increasing inaccuracy in the equipment response model.

Clearly, there are numerous applications requiring reliable and efficient methods and apparatus by which spatially resolved and time resolved equipment response models can be easily and economically developed and maintained. An example of an important application is the uniform processing of workpieces such as semiconductor wafers, flatpanel displays, and other electronic devices. Furthermore, there is a need for methods and apparatus capable of collecting data for response models in a nonperturbing manner on unmodified process equipment running realistic process conditions. Still further, there is a need for methods and apparatus capable of generating, checking, and frequently updating response models for individual pieces of equipment in a manufacturing facility so as to improve the operating efficiency, improve the productivity, and reduce the cost of ownership for the equipment and for the overall manufacturing facility.

SUMMARY

This invention seeks to provide methods and apparatus that can improve the performance and productivity of processes and process tools used for processing workpieces. One aspect of the present invention includes methods of acquiring data for generating response models and for monitoring, controlling, and optimizing processes and process tools. The method is carried out using a sensor apparatus that has information processing capabilities. The method includes the step of loading the sensor apparatus into the process tool and measuring the operating characteristics with the sensor apparatus. The method further includes converting the measured operating characteristics into digital data using the sensor apparatus. In addition, the method includes performing at least one step of storing the digital data in the sensor apparatus and transmitting the digital data to a receiver.

Another aspect of the present invention is an apparatus for acquiring data for monitoring, controlling, and optimizing processes and process tools. The apparatus includes a substrate and at least one sensor supported by the substrate. An information processor having information processing capability is supported by the substrate. The information processor is connected with the sensor so that information from the sensor can be provided to information processor. An internal communicator is supported by the substrate. The internal communicator is connected with the information processor so that the information processor can provide information to the internal communicator. The internal communicator is capable of transmitting information received from the information processor. A power source is supported by the substrate. The power source is connected so as to provide power to at least one of: the information processor, the internal communicator, and the sensor.

In a further embodiment of the apparatus, the internal communicator is capable of using wireless communication techniques for transmitting information to a receiver.

Optionally, the internal communicator is capable of bi-directional communication.

In a still further embodiment, the information processor may have data storage capability for storing measured data, storing operational data, storing calibration data, and other information. Optionally, the information processor may also have capabilities for mathematically manipulating the measured data.

Another aspect of the present invention includes a method of operating a sensor apparatus for acquiring data for monitoring, controlling, and optimizing processes and process tools. In an example embodiment, the method includes a program that is executable by the sensor apparatus. The method includes the step of initializing the sensor apparatus so that the sensor apparatus is ready for collecting and processing data. The method also includes the step of causing the sensor apparatus to do at least one step of: collecting and processing data, sending data to a receiver, storing data, and executing an operational command. The method may include, after the initializing step, the step of causing the sensor apparatus to enter a sleep mode for the purpose of reducing power use.

Still, another aspect of the present invention includes a method of operating a manufacturing facility for processing workpieces. The method includes the step of providing at least one process tool capable of processing workpieces. The method also includes the step of providing a sensor apparatus capable of wirelessly collecting process data. The sensor apparatus is capable of at least one of 1. wirelessly transmitting process data from within the process tool and 2. storing process data while in the process tool. In addition, the sensor apparatus is also capable of being loaded into and unloaded from the process tool without substantially interrupting the operation of the process tool. The method also includes the step of measuring process data for operation of the process tool using the sensor apparatus. The method further includes performing at least one step of monitoring the performance of the process tool using data from the sensor apparatus and maintaining the performance of the process tool in response to process data measured with the sensor apparatus.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out aspects of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is not intended to define the invention of the application, which is measured by the claims, nor is the abstract intended to be limiting as to the scope of the invention in any way.

The above and still further features and advantages of the present invention will become apparent upon consideration of the following detailed descriptions of specific embodiments thereof, especially when taken in conjunction with the accompanying drawings.

DESCRIPTION

Figure 1:
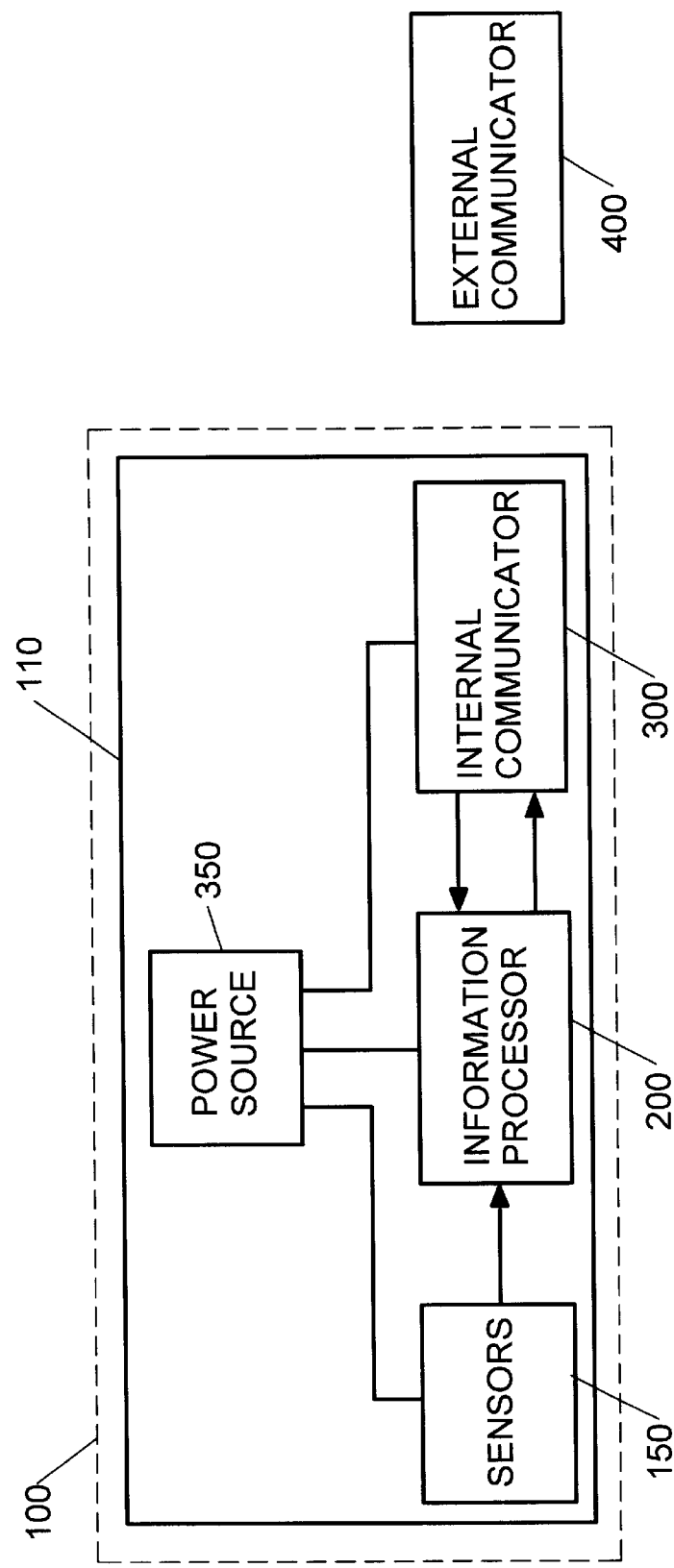
FIG. 1 is a block diagram of an embodiment of the present invention shown in relation to additional communication equipment.

The operation of embodiments of the present invention will be discussed below, primarily, in the context of processing semiconductor wafers or flat panel displays. However, it is to be understood that embodiments in accordance with the present invention may be used for measuring process characteristics and generating response models for essentially any processing step involving a workpiece subjected to potential temporal and/or spatial variations in process conditions.

In the following description of the figures, identical reference numerals have been used when designating substantially identical elements or steps that are common to the figures.

Reference is now made to FIG. 1 wherein there is shown a block diagram for a sensor apparatus 100. Sensor apparatus 100 includes a substrate 110, a sensor, preferably a plurality of sensors 150, an information processor 200, an internal communicator 300, and a power source 350. Sensors 150, information processor 200, internal communicator 300, and power source 350 are supported by substrate 110. Sensors 150 are connected with information processor 200 so as to allow signals generated by sensors 150 to be provided as input to information processor 200. Information processor 200 is connected with internal communicator 300 so as to allow information and data from information processor 200 to be transferred to internal communicator 300. In preferred embodiments, information processor 200 is connected with internal communicator 300 so as to allow bi-directional information transfer between information processor 200 and internal communicator 300.

Power source 350 is connected with information processor 200 so as to provide electric power to information processor 200. Power source 350 is connected with internal communicator 300 so as to provide electric power to internal communicator 300. Embodiments of the present invention may include sensors 150 for which sensors 150 require electric power for operation; for those embodiments, power source 350 is connected with sensors 150 so as to provide electric power to sensors 150. In alternative embodiments, sensors 150 do not require electric power; consequently, connection with electric power source 350 is unnecessary for such embodiments.

Internal communicator 300 is a transmitter capable of transmitting information and data received from information processor 200 to a receiver. For embodiments in which information processor 200 and internal communicator 300 are coupled for bi-directional information transfer, it is preferred for internal communicator 300 to be capable of transmitting information to a receiver in addition to receiving information from a transmitter.

FIG. 1 also shows an optional external communicator 400 arranged so as to receive information transmitted by internal communicator 300. External communicator 400 is a receiver capable of receiving data and information transmitted by internal communicator 300. Alternatively, external communicator 400 may be capable of transmitting information to internal communicator 300 for embodiments of the present invention having internal communicator 300 capable of bi-directional information transfer.

In preferred embodiments, internal communicator 300 is capable of bi-directional information transfer with external communicator 400 without wires, without cables, and without need for a continuous physical connection of any kind. In other words, the information is transferred wirelessly using techniques of wireless communication. Two examples of suitable wireless communication techniques are techniques that use sound and techniques that use electromagnetic radiation. Substantially any type of electromagnetic radiation that is usable for communication applications may be suitable for embodiments of the present invention. Examples of suitable types of electromagnetic radiation are microwave radiation, radio frequency radiation, ultraviolet radiation, visible light radiation, and infrared radiation. One embodiment of the present invention uses pulsed infrared light with a wavelength between 850 nm and 900 nm for wireless communication.

Substrate 110 supports and serves as a carrier for sensors 150, information processor 200, internal communicator 300, and power source 350. Preferably, substrate 110 has material properties similar to those of the workpieces.

For embodiments of the present invention used for characterizing semiconductor processes, substrate 110, preferably, has material properties similar to the materials included in the semiconductor wafer workpieces. Specifically, substrate 110 may be made of the semiconductor material such as silicon for silicon processing and gallium arsenide for gallium arsenide processing. Similarly, for characterizing flatpanel display processes, substrate 110 may be made of glass or other materials typically used in workpieces for flatpanel display fabrication.

Alternatively, substrate 110 may comprise materials other than those materials used for the workpieces. The selection of the materials for substrate 110 may be influenced by factors such as costs of the material, ease of using the material for sensor apparatus 100, durability, and robustness of the material for application in sensor apparatus 100. Preferably, the material used for substrate 110 is selected so the material does not substantially contaminate or alter the process tool. Furthermore, it is preferable for the material used for substrate 110 to be capable of allowing substantially correct measurements to be made by sensor apparatus 100. In other words, the material should be selected so that the material does not contribute uncorrectable errors to the process measurements.

In addition to having substrate 110 materially similar to the workpieces, it is also preferable for sensor apparatus 100 to have dimensions similar to those of the workpieces. Specifically, it is desirable for sensor apparatus 100 to have dimensions similar to those of the workpiece so as to mimic the behavior of the workpiece in the process tool. It is preferable for sensor apparatus 100 to have dimensions so that sensor apparatus 100 can be loaded into the process tool using the same entry port used for loading the workpieces. This feature can eliminate the need for dismantling the process tool for loading and unloading sensor apparatus 100.

Numerous manufacturing operations use mechanical handling equipment for loading and unloading workpieces into and out of process tools. The mechanical handling equipment is usually automated so as to reduce the amount of human involvement in loading and unloading workpieces. A robot is an example of automated handling equipment that is frequently used in manufacturing operations for loading and unloading workpieces. For instance, robots are frequently used to handle workpieces for electronic device fabrication. It is desirable for sensor apparatus 100 to have dimensions so as to be capable of being loaded and unloaded to and from the process tool using substantially the same robot used for the workpieces so that disruptions to the manufacturing operation are minimized.

Optionally, for some embodiments of the present invention for semiconductor processing applications, substrate 110 comprises a semiconductor wafer. The semiconductor wafer is provided to simulate actual processing conditions so as to present substantially appropriate physical profile, thermal mass, other key electrical properties, and key chemical properties to the processing environment. Similarly, for flatpanel display applications, substrate 110 may comprise a flatpanel display substrate.

Additionally, substrate 110 may serve as a base supporting wiring used for interconnecting sensors 150, information processor 200, internal communicator 300, and power source 350. Standard interconnecting techniques for wiring electronic devices may be used such as those techniques used for integrated circuits and printed circuit boards. Preferably, the sensors and their interconnects are specifically designed to be simple and economical. The use of large feature sizes can allow fabrication and/or interconnection of sensors 150 using technologies such as silk screening or contact photomasking rather than higher cost projection printing or direct e-beam writing technologies.

Sensors 150 may be of any type necessary for the desired measurements. It is also possible to include multiple types of sensors for sensors 150 so as to be able to measure different types of process characteristics substantially simultaneously or at least during the same data acquisition session. Of course, another option is to include different types of sensors for measuring the same process parameter for purposes such as calibration and sensor performance comparisons.

Sensors 150 are designed to provide an electrical signal proportional to some basic, local process parameter that is representative of the process and process tool. Examples of process parameters of importance for applications such as semiconductor processing and flatpanel display processing include temperature, etch rate, deposition rate, RF field, plasma potential, and ion flux. It is desirable to have sensors that are relatively low in cost since a plurality of sensors may be used as part of each sensor apparatus 100.

Examples of typical sensor types include: Resistor, Temperature Dependent sensors (RTD) for temperature measurement; thermistors for temperature measurement; defined area probes for measuring plasma potential and measuring ion flux; Van der Paw crosses for measuring etch rate; isolated field transistors for measuring plasma potential; and current loops for measuring ion flux and measuring RF field.

Individual sensors that make up sensors 150 may be distributed across substrate 110 in an array so as to provide a map or distribution of measurements of a particular parameter. Embodiments of the present invention, in which sensors 150 include different types of sensors, may be capable of providing a process fingerprint or process profile based on measurements of multiple process characteristics. The numbers and types of sensors are selected based upon the specific application and process requirements.

Sensors 150 may include discrete sensor devices attached to substrate 110. Alternatively, sensors 150 may be fabricated as part of substrate 110. In other words, substrate 110 may be processed to fabricate sensors 150 as an integrated part of substrate 110.

Information processor 200, preferably, is capable of interfacing with a variety of sensor types, and preferred embodiments of the present invention include more than one sensor. Preferably, information processor 200 is interfaced with sensors 150 so as to be capable of receiving information from sensors 150. In other embodiments, it may be desirable for information processor 200 to be interfaced to sensors 150 so that information processor 200 can provide information to sensors 150. Embodiments of the present invention may include sensors that require input signals. As a specific example, the sensors may include their own microprocessor for processing information and instructions.

An important characteristic of sensor apparatus 100 is its bandwidth. In preferred embodiments, sensor apparatus 100 has adequate signal handling bandwidth to allow use in configurations so as to permit highly resolved spatial, highly resolved temporal, or highly resolved spatial and highly resolved temporal monitoring. The definition of highly resolved spatial and highly resolved temporal monitoring will depend upon the particular application for sensor apparatus 100.

For applications involving semiconductor wafer processing, there may be from 1 sensor on sensor apparatus 100 to over 50 sensors on sensor apparatus 100. One example of highly resolved spatial monitoring for processes using semiconductor wafers having diameters of about 200 mm would be to have greater than about 50 sensors on sensor apparatus 100. Similarly, temporal revolution for semiconductor wafer processing may range from over about one second per reading to less than about 0.01 second per reading. For such applications, highly resolved temporal monitoring may be considered as greater than about 1 reading per second. In one embodiment, there may be 50 sensors, 1 reading per second, and 12 bits per reading; adequate bandwidth for such an embodiment would be about 600 bits per second.

In addition to multiple sensor interconnect capability and adequate bandwidth, there are other desirable capabilities for information processor 200. Preferably, information processor 200 is capable of controlling acquisition of the data. Specifically, information processor 200 scans sensors 150 to obtain data for spatially resolved response models, time resolved response models, or combinations of the two. In preferred embodiments, information processor 200 includes the capability of providing flexible programmable acquisition sequencing. In addition, it is preferable for information processor 200 to be capable of providing flexible programmable trade-offs between temporal and spatial resolution for various sensor types. This is a potentially valuable capability because different types of sensors may have greater value for time resolution rather than spatial resolution and vice versa.

Depending upon the types of measurements to be made, information processor 200 may need to be capable of conditioning the signals received from sensors 150. Examples of signal conditioning include signal amplification and noise filtering. Signal conditioning techniques are well known in the art; a detailed discussion will not be presented here.

Another capability that may be preferred for information processor 200 is analog to digital (A/D) conversion of the signals from sensors 150. Typically, this is a desired function for information processor 200 when sensors 150 provide analog signals to the information processor 200. Preferably, information processor 200 is able to provide flexible analog gain and flexible range selection for the sensor inputs.

Local data storage is another preferred capability to be possessed by information processor 200. With local data storage capability, sensor apparatus 100 is able to store data such as calibration data for the sensors, sensor validation data, identification information specific to each sensor apparatus, and measurement data derived from the sensors. Optionally, local data storage capability allows information processor 200 to store data collected from the sensors, or to store data from the sensors in addition to transmitting the data in substantially real-time. Data stored in information processor 200 can be saved and later downloaded to another information repository. An additional benefit of having data storage capability onboard sensor apparatus 100 is the possibility of reduced need for bandwidth. Specifically, significantly lower bandwidth is acceptable if the measured data can be stored and later transmitted; the lower bandwidth would merely require more time for transmitting the data.

The local data storage capability of information processor 200 provides other benefits as well. Specifically, absolute accuracy for the sensor measurements is not critical because sensor apparatus 100 can be calibrated as a unit; site-specific calibration and linearization factors can be maintained as part of the local data storage. In other words, information can be stored onboard sensor apparatus 100 for use when needed. This is particularly advantageous because sensor apparatus 100 is able to store or transmit corrected data derived using the stored calibration data.

Power source 350 is a local, onboard power source for providing electrical power needed for operation of sensor apparatus 100. Preferably, power source 350 is sufficiently self-contained so that sensor apparatus 100 does not need to be physically connected to an outside power source while collecting data. In preferred embodiments, power source 350 includes a stored power source such as a battery. Another prospective power source is a capacitor. Other power sources for driving electronic devices are suitable for embodiments of the present invention.

As a result of having an onboard power source, sensor apparatus 100 is more capable of acquiring data for response models in a substantially nonperturbing manner. In addition, modifications to the process tool in order to make physical connections to an external power source are unnecessary. Advantageously, the absence of wires and cables makes it easier to load and unload sensor apparatus 100 using substantially the same robots as those used for loading and unloading the workpieces.

Internal communicator 300 is a communication device. There are numerous publications describing communication devices that are suitable for use as internal communicator 300. In a preferred embodiment of the present invention, the communication function is performed using readily available infrared emitting and detecting components. These components and technology are in widespread use for short-range communication applications such as appliance remote control.

Furthermore, several communications protocols exist which are suitable for use in embodiments of the present invention. For example, one embodiment of the present invention may use a modified ASCII code with Cyclic Redundancy Check (CRC) for error detection and an automatic baud rate matching method.

Another embodiment of the present invention includes having repeating groups of sensors 150, information processor 200, internal communicator 300, and power source 350 supported all on the same substrate 110. This embodiment has potential advantages in offering more spatial resolution for the measurements as a result of having more sensors. There is also the possibility of having greater bandwidth for handling information as a result of having more resources for information-processing and data transmission.

Figure 2:
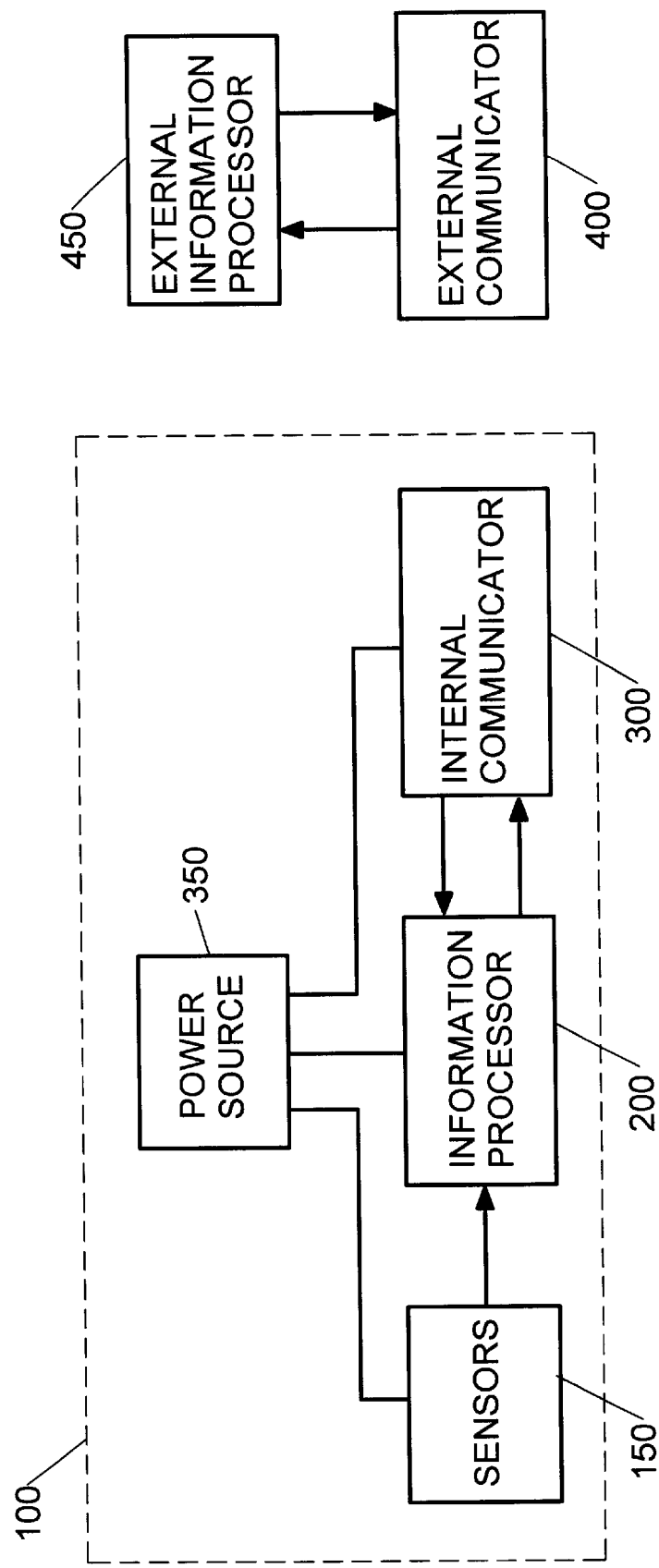
FIG. 2 is a block diagram of an embodiment of the present invention shown in relation to additional information processing and communication equipment.

Reference is now made to FIG. 2 wherein there is shown a block diagram for sensor apparatus 100; sensor apparatus 100 is substantially the same as that described for FIG. 1 (substrate 110 is not shown in FIG. 2). In addition, FIG. 2 also shows external communicator 400; external communicator 400 shown in FIG. 2 is substantially the same as that described for FIG. 1. An external information processor 450 is shown coupled to external communicator 400 so as to permit the transfer of information between external information processor 450 and external communicator 400. External information processor 450 has information-processing capabilities like those of a computer. Optionally, external information processor 450 may be a computer or other computer like device capable of handling information received from external communicator 400. External information processor 450 may be capable of mass data storage.

A desirable function for external information processor 450 is to serve as a user interface so that a user can obtain the information provided by sensor apparatus 100. In addition, it is also desirable for external information processor 450 to allow the user to send commands and information to sensor apparatus 100: for example, setup and start condition information prior to data collection.

Figure 3:
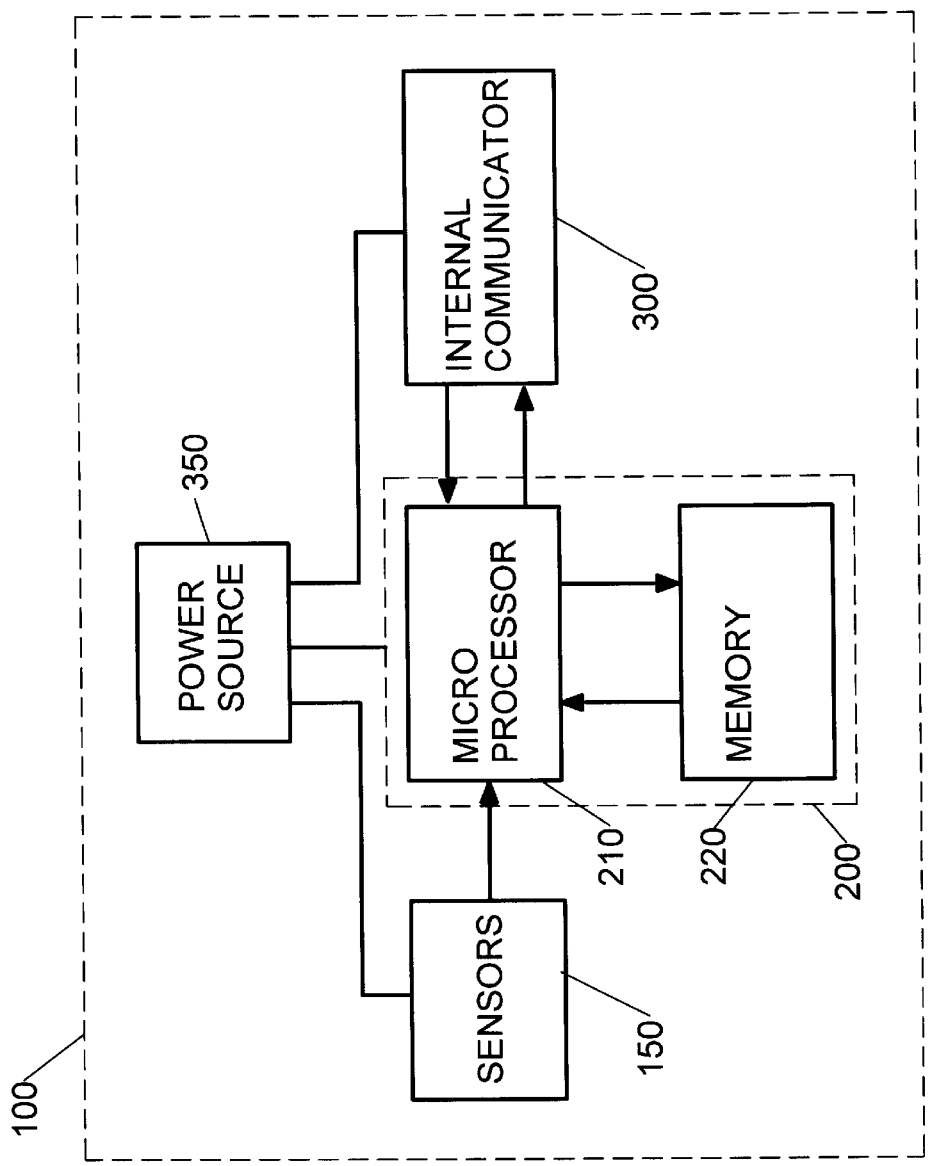
FIG. 3 is a block diagram of another embodiment of the present invention.

Reference is now made to FIG. 3 wherein there is shown sensor apparatus 100. Sensor apparatus 100 shown in FIG. 3 is substantially the same as that presented in FIG. 1 and FIG. 2 (substrate 110 is not shown in FIG. 3) with the exception that more details are shown for information processor 200. Information processor 200 includes a microprocessor 210 and a memory 220. Microprocessor 210 is connected with memory 220 so as to allow information transfer between microprocessor 210 and memory 220.

Microprocessor 210 includes a central processing unit and other capabilities for collecting data from the sensors, processing the data received from the sensors, storing the data from the sensors in memory 220, sending the data from the sensors to internal communicator 300, responding to commands received via internal communicator 300, and generally controlling the operation of sensor apparatus 100. There are numerous microprocessors that are suitable for use in embodiments of the present invention. Microchip Technologies, Inc. produces a number of microprocessors that are suitable for embodiments of the present invention. Some of the commercially available microprocessors are capable of signal conditioning and analog to digital conversion of input signals.

There are numerous suitable types of electronic memory devices for memory 220. Memory 220 may include random access memory (RAM), read only memory (ROM), or combinations of RAM and ROM. One embodiment of the present invention includes memory 220 having an EEPROM such as those made by Microchip Technologies, Inc.

Figure 4:
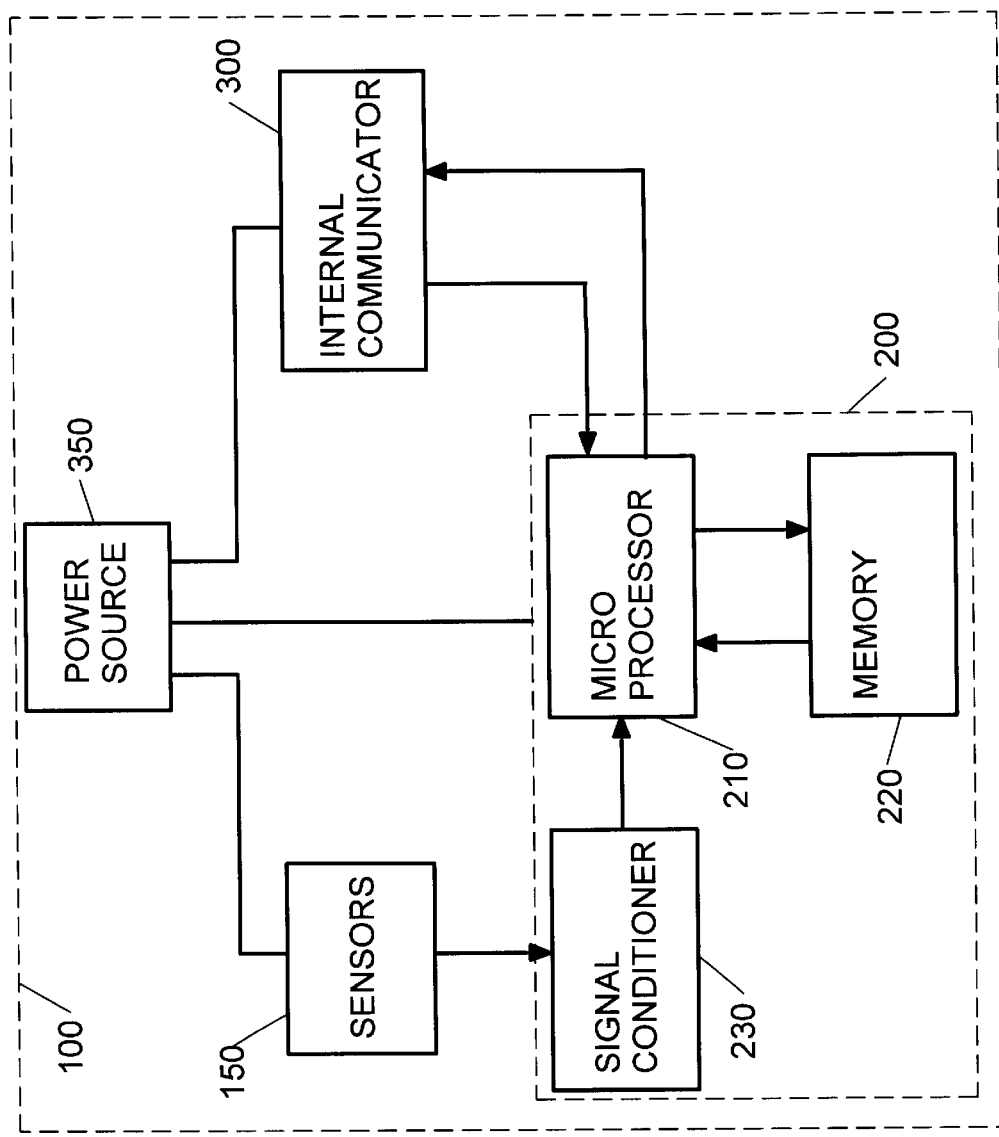
FIG. 4 is a block diagram of another embodiment of the present invention.

Reference is now made to FIG. 4 wherein there is shown sensor apparatus 100. Sensor apparatus 100 shown in FIG. 4 is substantially the same as that presented in FIG. 3 with the exception that an alternative configuration is shown for information processor 200. Specifically, information processor 200 includes a signal conditioner 230 connected between microprocessor 210 and sensors 150. Signal conditioner 230 is capable of modifying the signals received from sensors 150. The signal modifications may be required so as to make the signals more compatible with the input requirements for microprocessor 210. Signal modifications may also be required for activities such as noise filtering.

Figure 5:
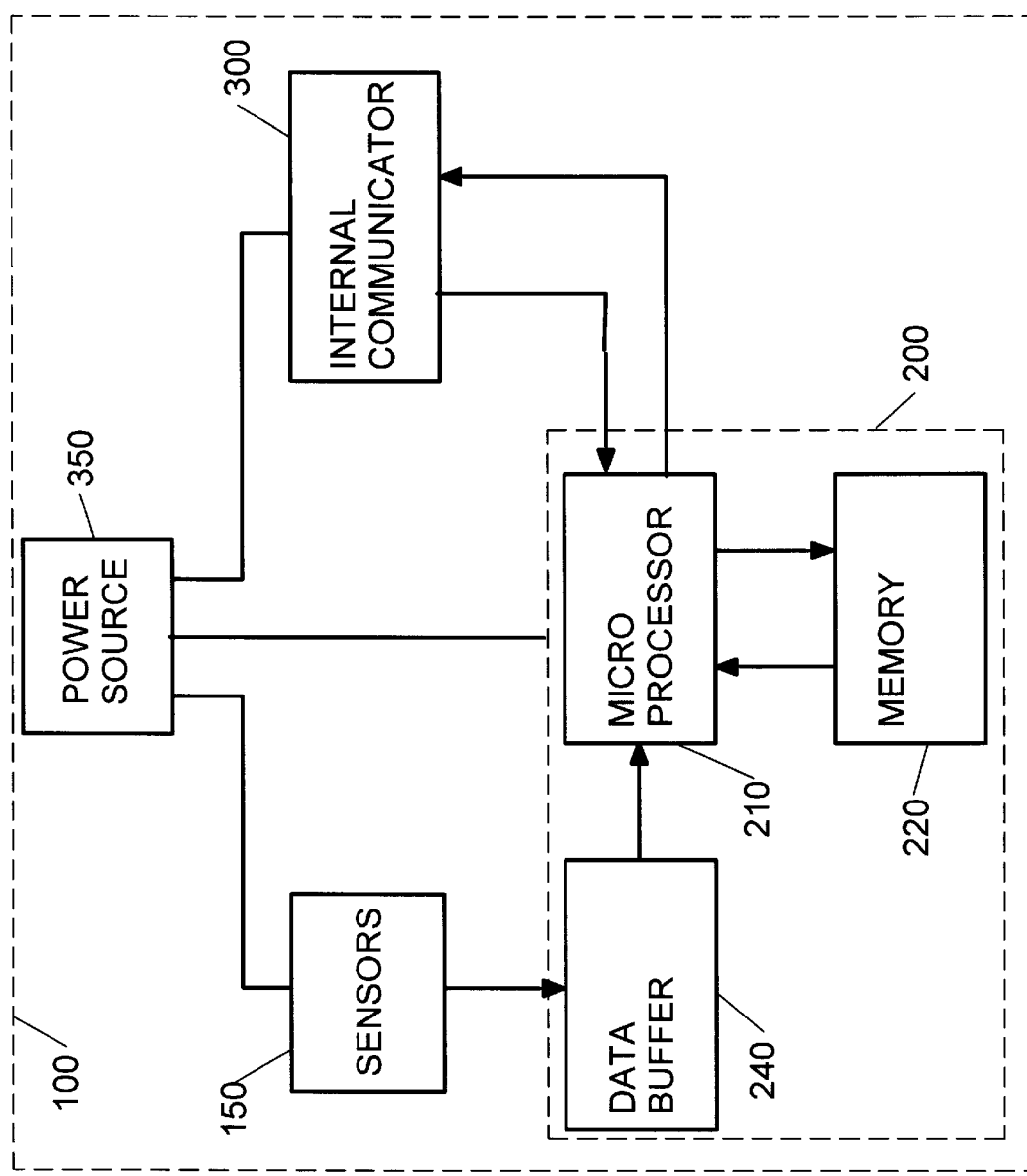
FIG. 5 is a block diagram of another embodiment of the present invention.

Reference is now made to FIG. 5 wherein there is shown sensor apparatus 100. Sensor apparatus 100 shown in FIG. 5 is substantially the same as that presented in FIG. 3 with the exception that an alternative configuration is shown for information processor 200. Specifically, information processor 200 includes a data buffer 240 connected between microprocessor 210 and sensors 150. Data buffer 240 facilitates management of the data flow between sensors 150 and microprocessor 210. Data buffers are commonly used in applications involving data acquisition; details of data buffer operation will not be presented here.

Figure 6:
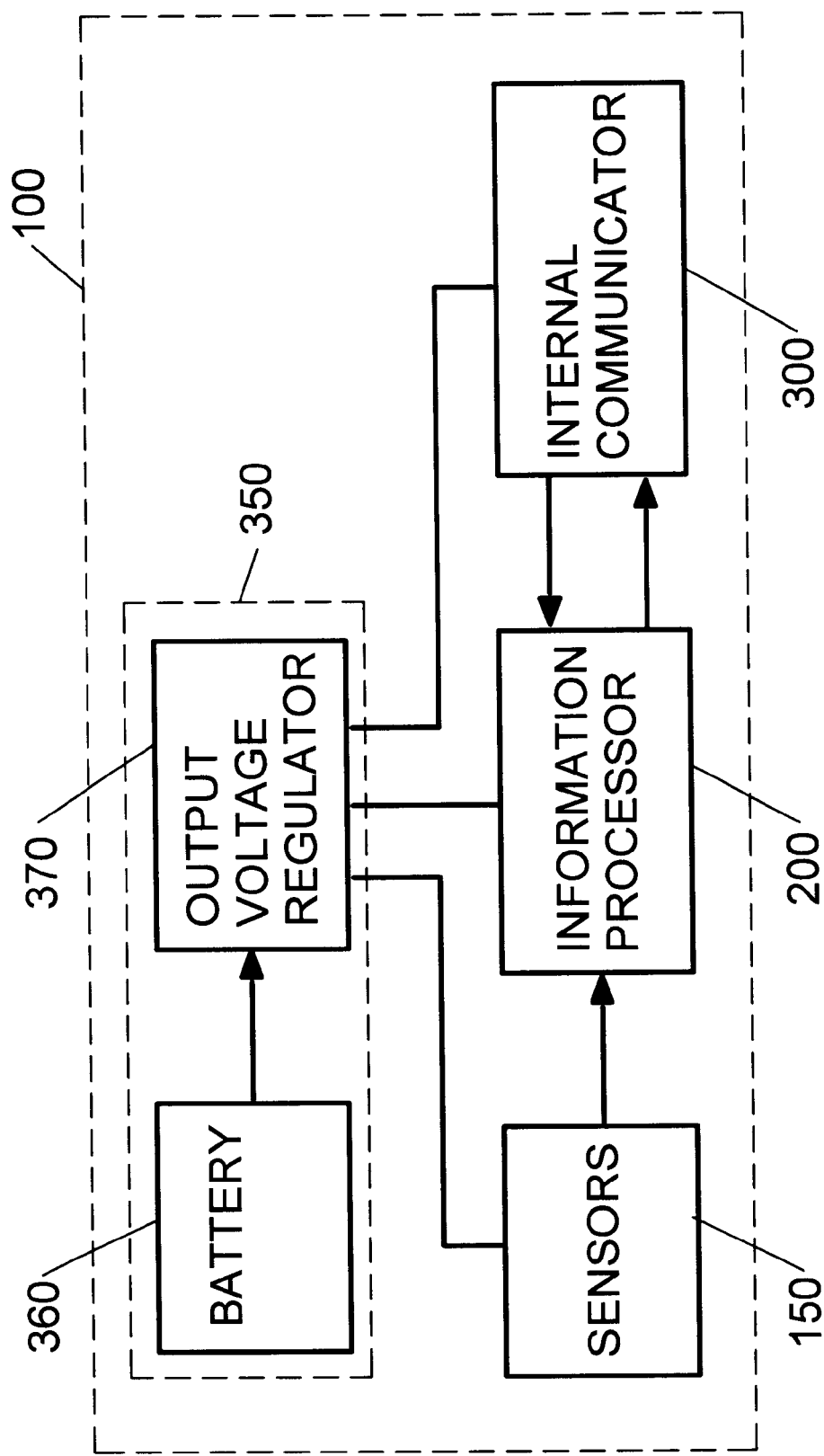
FIG. 6 is a block diagram of another embodiment of the present invention.

Reference is now made to FIG. 6 wherein there is shown sensor apparatus 100. Sensor apparatus 100 shown in FIG. 6 is substantially the same as that presented in FIG. 1 (substrate 110 is not shown in FIG. 6) with the exception that a more detailed configuration for power source 350 is shown. Specifically, power source 350 includes a battery 360 and an output voltage regulator 370 connected at the output of battery 360.

It is possible for power source 350 to use battery 360 without output voltage regulator 370. However, as battery 360 is used, the output voltage of battery 360 decreases. The decrease in output voltage of battery 360 reduces the operational reliability of the electronic devices powered by battery 360. In other words, the time available for stable operation may be undesirably short. The inclusion of output voltage regulator 370 helps to alleviate the problem. Output voltage regulator 370 is capable of providing a substantially constant output voltage over a wide range of input voltages from battery 360. Advantageously, output voltage regulator 370 allows sensor apparatus 100 to operate using a wider range of input battery voltage.

In one embodiment of the present invention, battery 360 comprises one or more small, rechargeable lithium batteries capable of providing a nominal output voltage of 3.3 volts. Preferably, sensor apparatus 100 is capable of allowing battery 360 to be recharged while battery 360 is installed in sensor apparatus 100. The capability for battery recharging may include electrical contacts allowing sensor apparatus 100 to connect with an external power source for the purpose of recharging battery 360. In addition, the capability for battery charging may include noncontact recharging capabilities such as recharging techniques based on magnetic induction.

As an alternative to using rechargeable batteries, battery 360 may be a non-rechargeable battery. The non-rechargeable battery may be discarded and replaced when necessary.

It is to be understood that the recharging capabilities described for batteries may be applied to power sources other than batteries. As an example, capacitors may be recharged using analogous techniques to those used for batteries.

Output voltage regulator 370 may be of any suitable type; suitable regulators are commercially available. Some of the suitable regulators may comprise a charge pump integrated circuit such as those made by corporations such as Burr Brown and Maxim.

Figure 7:
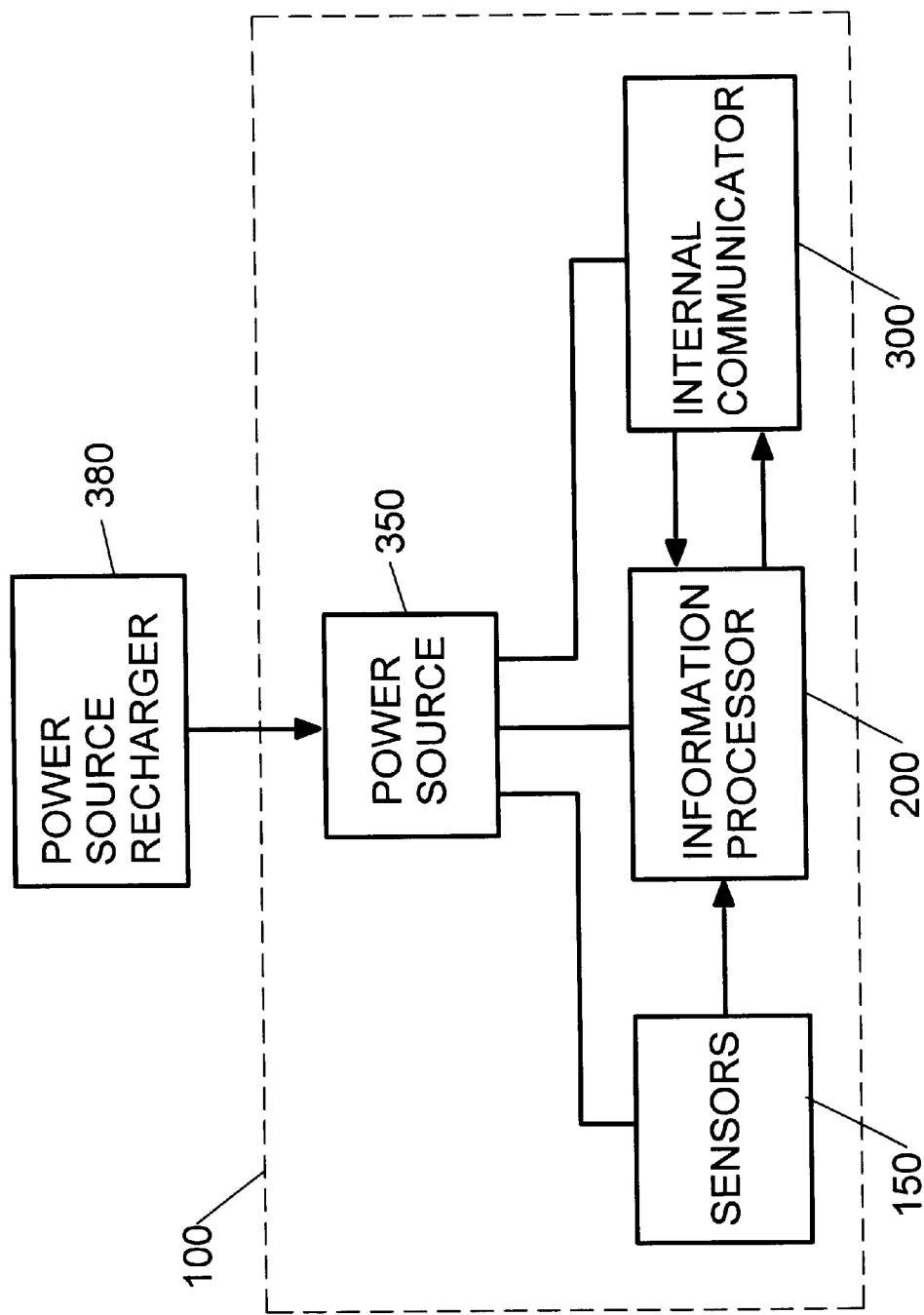
FIG. 7 is a block diagram of another embodiment of the present invention.

Reference is now made to FIG. 7 wherein there is shown sensor apparatus 100. Sensor apparatus 100 shown in FIG. 7 is substantially the same as that presented in FIG. 1 (substrate 110 is not shown in FIG. 7). Also shown is a power source re-charger 380 disposed so as to be capable of wirelessly recharging power source 350. An advantage of wireless recharging capability is the possible reduced need for physically contacting sensor apparatus 100. In preferred embodiments, sensor apparatus 100 includes the capability of wirelessly recharging power source 350 and also includes the capability of recharging power source 350 via a physical electrical connection.

Figure 8:
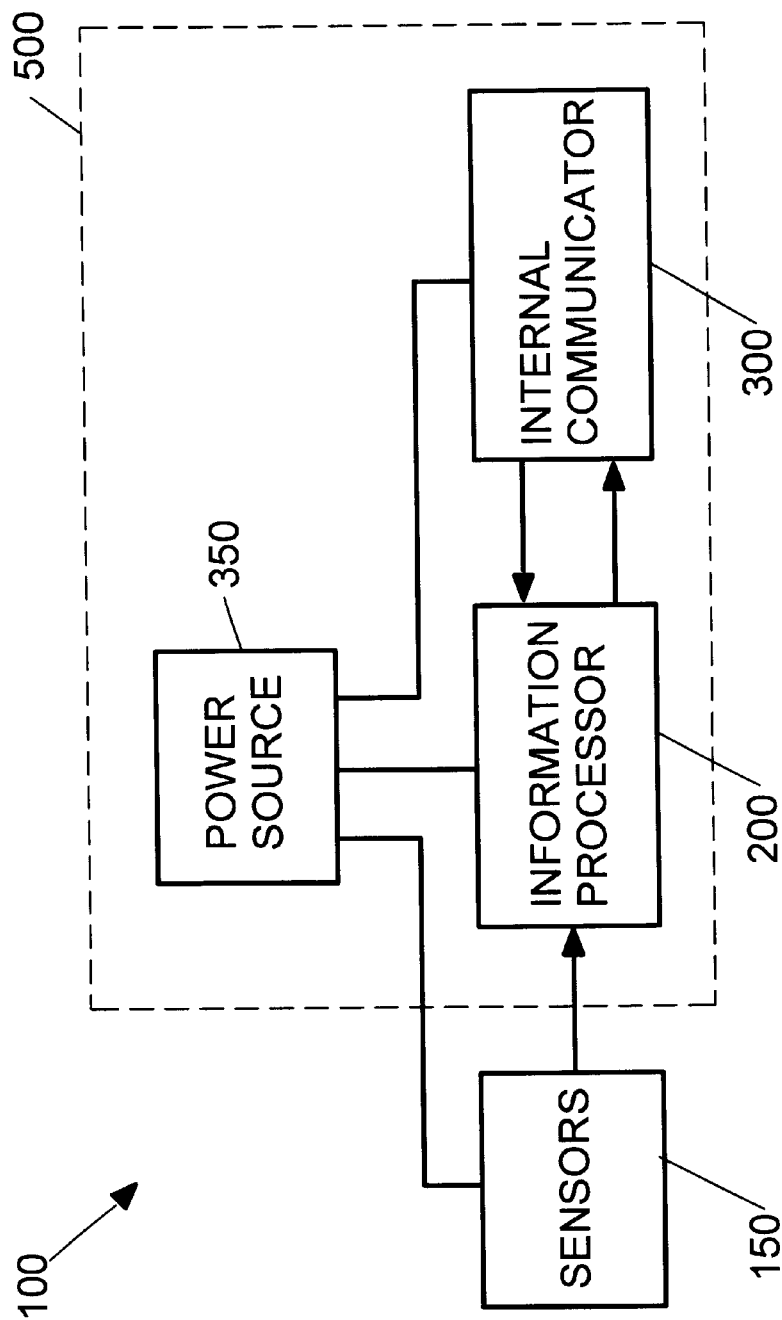
FIG. 8 is a block diagram showing components that may need shielding in an embodiment of the present invention.

Reference is now made to FIG. 8 wherein there is shown sensor apparatus 100. Sensor apparatus 100 shown in FIG. 8 is substantially the same as that presented in FIG. 1 (substrate 110 is not shown in FIG. 8). For some applications of embodiments of the present invention, the measurements for the response models may need to be obtained in environments that are incompatible with electronic components that are in standard use or that are readily available. Consequently, it may be necessary to shield some or all of the electronic components included in sensor apparatus 100 so that the components can operate under the conditions of the process environment. FIG. 8 shows an example of components that may need to be shielded. Shielded components 500 include information processor 200, internal communicator 300, and power source 350. Shielded components 500 may need to be protected from process conditions such as excessive heat, ion bombardment, electric field, magnetic field, electromagnetic energy, and corrosive chemicals. In other words, shielded components 500 need to be sufficiently isolated from any process conditions that prevent operation of the electronic components in sensor apparatus 100 when collecting data. Ideally, the electronic devices are shielded so that they experience only conditions that are within their manufacturer's recommendations. The operating specifications for electronic devices are usually available from the manufacturer of the devices. In other words, a preferred embodiment of the present invention includes sufficient shielding to allow the electronic devices to operate when the sensor apparatus measures process conditions detrimental to the functioning of the electronic components.

Some embodiments of the present invention may need to have shielding so as to substantially prevent exposure of the process tool or process environment to contaminants from sensor apparatus 100. For instance, if sensor apparatus 100 includes materials that degrade when exposed to the process conditions being measured, then those materials may need to be shielded or hermetically enclosed so as to substantially prevent products from the degraded material from escaping into the process environment.

Figure 9:
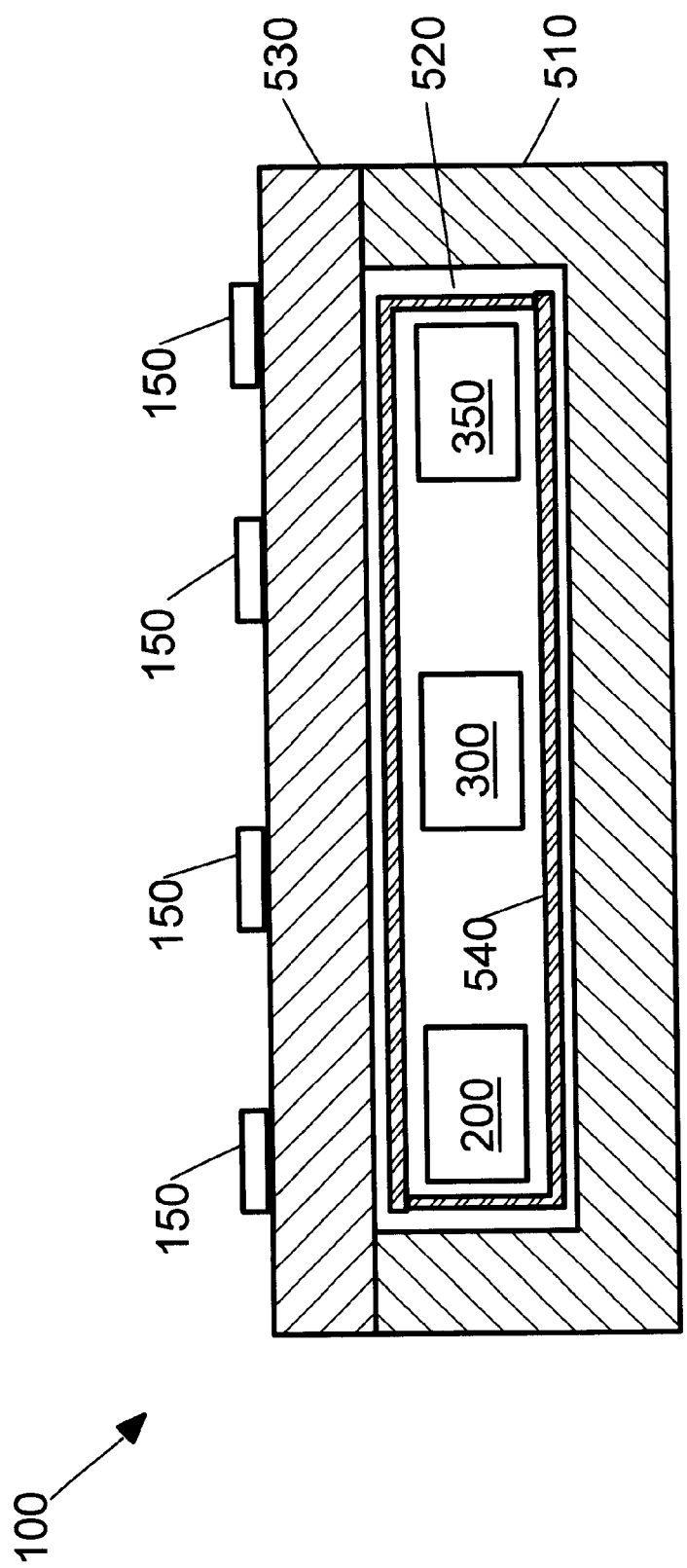
FIG. 9 is a cross-sectional diagram of an embodiment of the present invention.

Reference is now made to FIG. 9 wherein there is shown a cross section of an embodiment of sensor apparatus 100. The diagram for sensor apparatus 100 shown in FIG. 9 is substantially the same as that presented in FIG. 8 but with some modifications. FIG. 9 shows substrate 510. Substrate 510 has a cavity 520. Information processor 200, internal communicator 300, and power source 350 are supported by substrate 510 substantially within cavity 520. Substrate cover 530 is connected with substrate 510 so as to substantially cover cavity 520. Preferably, substrate cover 530 has chemical, physical, and electrical properties similar to those of the workpiece. Optionally, information processor 200, internal communicator 300, and power source 350 may be partially or substantially completely enclosed within cavity 520. In addition, FIG. 9 shows sensors 150 located on the exterior side of substrate cover 530.

A shield 540 partially or substantially completely surrounds information processor 200, internal communicator 300, and power source 350. Preferably, shield 540 is located within cavity 520. Shield 540 has properties for substantially isolating information processor 200, internal communicator 300, and power source 350 from process conditions such as excessive amounts of heat, electric field, magnetic field, electromagnetic energy, ion bombardment, and corrosive chemicals.

Preferably, shield 540 includes materials or structures capable of providing sufficient robustness and isolation of the devices to allow operation of sensor apparatus 100 in the presence of the process conditions. The process conditions may include excessive amounts of electric field, magnetic field, electromagnetic radiation, RF radiation, microwave radiation, ion bombardment, exposure to temperatures greater than about 100 C., and exposure to corrosive chemicals. Ideally, the electronic devices are shielded so that they experience only conditions that are within their manufacturer's recommendations.

An additional or alternative use of shield 540 includes protecting the process environment from possible contamination from sensor apparatus 100. For instance, shield 540 may need to substantially prevent exposure of the process tool or process chamber to chemicals or materials that make up sensor apparatus 100 because the chemicals may interfere with the performance of the process tool or the performance of the process chamber, or the accuracy of the sensor measurements. Similarly, there may be a need for shield 540 to substantially prevent release of energy or signals from sensor apparatus 100 that could interfere with the performance of the process tool or the performance of the process chamber or the accuracy of the sensor measurements.

Some embodiments of the present invention may include shield 540 derived using standard technology for isolating components from electric field, magnetic field, electromagnetic radiation, RF radiation, microwave radiation, temperatures greater than about 100 C., and corrosive chemicals. In addition, embodiments of the present invention may also include shield 540 derived using techniques such as those used for fabricating microelectromechanical systems (MEMS).

Examples of suitable shielding techniques are techniques such as those that use Faraday cages, techniques such as those that use by-pass capacitors, techniques such as those that use inductive blocking, techniques such as those that include MEMS-based microcavity formation, techniques such as those that include polymer coatings for physical isolation, and techniques such as those that use polymer/metal/polymer sandwich coatings for electromagnetic shielding.

Examples of suitable shielding techniques for embodiments of the present invention can be found in the following books and publications: Klaassen, E. H. , "Thermal AC to RMS Converter", Stanford University Ph.D. Thesis, May 1996; Kovacs, G. T. A. , Micromachined Transducers Sourcebook, pp. 586–587, WCB McGraw-Hill, 1998, all of these references are incorporated herein by this reference.

In another embodiment, substrate 510 and substrate cover 530 form cavity 520 so that cavity 520 is hermetically sealed so as to be capable of substantially preventing the entry of process gases into cavity 520. Another advantage of hermetically sealing cavity 520 is that cavity 520 can also substantially prevent the escape of possible contaminants from cavity 520 so that sensor apparatus 100 does not substantially contaminate the process tool or process chamber. In a preferred embodiment, sensor apparatus 100 is capable of substantially maintaining vacuum conditions, i.e. sub-atmospheric pressure, created within cavity 520. In a further embodiment, sensor apparatus 100 also includes shield 540 within cavity 520. Shield 540 may partially or substantially completely surround information processor 200, internal communicator 300, and power source 350.

As mentioned in the discussion of FIG. 1, it is preferred for the sensor apparatus to have dimensions approximately the same as those of the workpiece. For semiconductor wafer applications, this means that the sensor apparatus should have diameters in the range of about 75 mm to about 300 mm for wafers that are currently available. Still larger diameters for the sensor apparatus will be needed when larger wafers come into use (such as wafers having diameters >300 mm). Applications involving flatpanel display processing may require substrate dimensions about the same as those for flatpanel display substrates; as an example, a flatpanel display substrate may have dimensions of about 45 cm×about 60 cm or larger. Of course, workpieces used in other types of processes and process equipment will have characteristic dimensions that will determine the dimensions of the sensor apparatus for those applications.

The electronic components of the sensor apparatus such as the information processor, the internal communicator, and the power source require an amount of area in order to be supported by the substrate. The amount of area is defined here as an area footprint. It is to be understood that the area footprint defined here excludes the area required by the sensors. Analogously, the electronic components will take-up an amount of volume in order to be contained within a cavity formed by the substrate. The amount of volume is defined here as a volume footprint.

For some embodiments of the present invention, it may be suitable for the area footprint or the volume footprint to approximately equal that of the sensor apparatus. However, for other embodiments of the present invention it is more suitable for the area footprint to be relatively small in comparison to the area of the sensor apparatus. A small area footprint in comparison to the area of the sensor apparatus can potentially increase the accuracy of the sensor measurements. Specifically, the small area footprint reduces the possibility of inducing errors in the measurements. The small footprint means that there is less possibility for the electronic devices to cause discontinuities in the characteristics of the sensor apparatus. In other words, the sensor apparatus is more likely to behave like the standard workpiece if the electronic components make up only a small portion of the sensor apparatus.

For typical semiconductor and flatpanel display applications, it is preferable for the area footprint for the sensor apparatus or materials to be not greater than about 20 percent of the area of the sensor apparatus. As an example calculation, this means that a sensor apparatus used for characterizing processes and process tools that process 75 mm diameter semiconductor wafers has a preferred area footprint of not greater than about 9 $cm^2$. Similarly, for 300 mm diameter wafers the footprint is preferably not greater than about 140 $cm^2$.

In some embodiments, it is more preferable for the area footprint for the sensor apparatus to be not greater than about 1 percent of the area of the sensor apparatus. In other embodiments, it is more preferable for the area footprint to be not greater than about 0.3 percent of the area of the sensor apparatus.

Applications of embodiments of the present invention for processing semiconductor wafers and flatpanel displays may have preferred height characteristics in addition to the preferred area footprint characteristics. For these applications, it may be preferred for the sensor apparatus to have a height of not more than about 1 cm. The ideal height for the sensor apparatus for applications involving processing semiconductor wafers and flatpanel displays is a height that is about equal to that of the semiconductor wafers and flatpanel displays.

Another aspect of the present invention is the use of embedded software for the sensor apparatus. Specifically, the software for operating the sensor apparatus is included with the sensor apparatus; in one embodiment, the software may be contained in the information processor. This means that the software may be arranged to be capable of operating from within the process environment that is being characterized by the sensor apparatus as well as outside of the process environment.

An implementation of the software has been written using assembly language. As is known to those skilled in the art, other programming languages can be used such as C, such as C++, and such as BASIC. Optionally, the software may be broken up into multiple files for easier readability. The software may employ subroutines for performing particular actions and commands.

Specific software commands and structures may be dependent upon the particular hardware configuration that will use the software. In the spirit of providing a general description of the software, the following description emphasizes novel features and critical features for embodiments of the present invention. Obvious hardware dependent generalities may not be described here unless necessary. In addition, details may not be given for well-known support algorithms such as error handling, device initialization, peripheral drivers, information transfer, timer control, and other general types of command execution.

Figure 10:
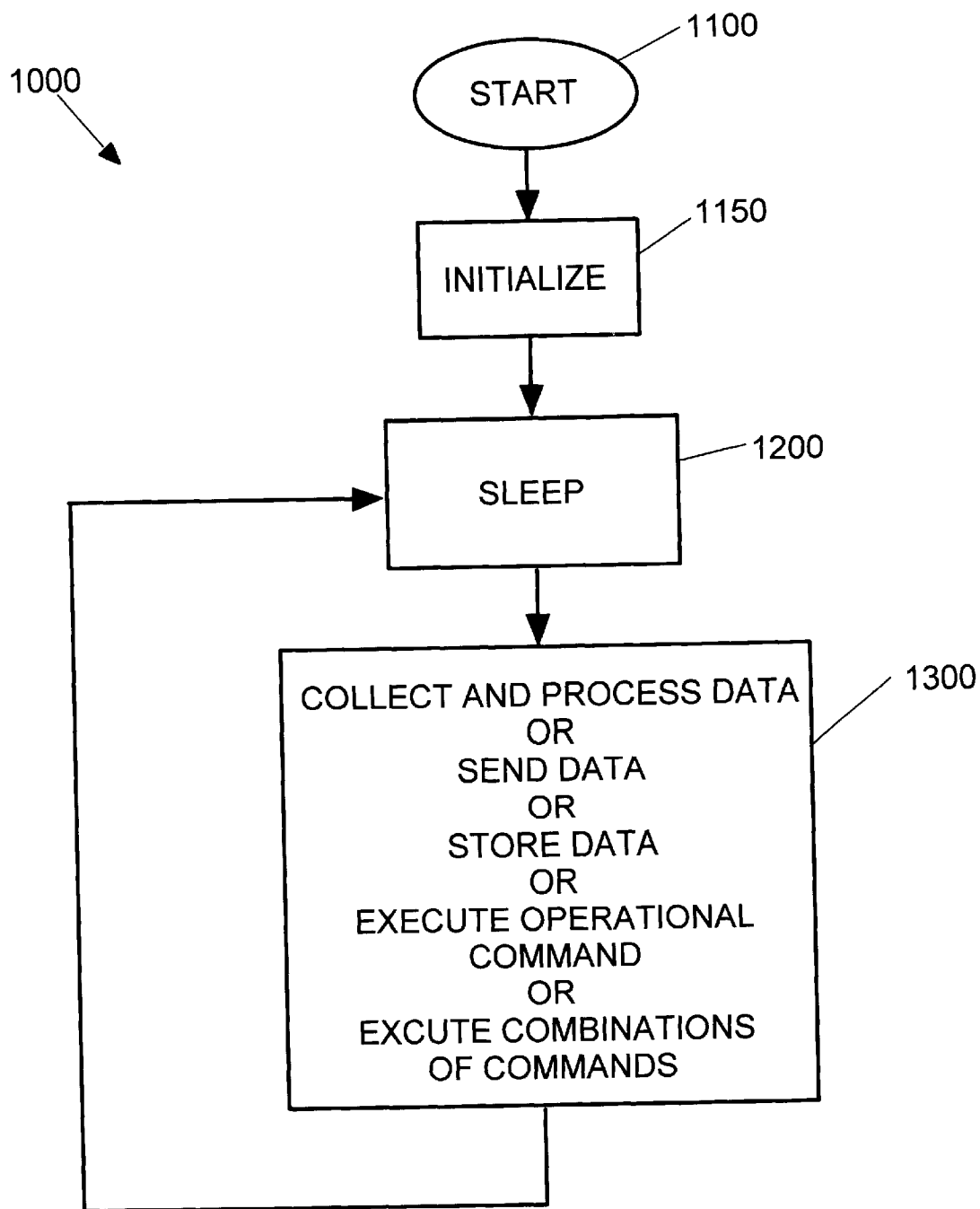
FIG. 10 is a flowchart illustrating the steps for controlling an embodiment of the present invention.

Reference is now made to FIG. 10 wherein there is shown a flow diagram 1000 of an embodiment of the software program for operating the sensor apparatus for purposes of acquiring sensor data, processing sensor data, storing data, and transmitting data. Step 1100 represents the start of the program. Initialize step 1150 follows step 1100. Initialize step 1150 may include initialization of memory, initialization of electronic devices and peripherals, read/write capability checks, and data validity checks. The main objective of the initialize step is to prepare the sensor apparatus for performing commands.

Sleep step 1200 follows initialize step 1150. After initialize step 1150, the software places the sensor apparatus into a sleep mode in which power usage by the sensor apparatus is reduced. Specifically, nonessential power consuming activities are stopped or decreased so as to reduce the drain of energy from the power source. For example, power used by the microprocessor is reduced. In addition, power to the sensors may be shutdown or reduced, if appropriate. In some embodiments, the program monitors for incoming commands as part of sleep step 1200. Specifically, sleep step 1200 causes the sensor apparatus to remain in the sleep mode until a command is received. After receiving the command, the program puts the sensor apparatus back into a normal mode so that standard power use can be resumed as needed. In preferred embodiments, the program responds to commands transmitted wirelessly to the sensor apparatus. Typically, the command will be initiated by a user or by an external computer.

Upon receiving the command, the program proceeds to a handle communications step 1300 where the command is executed. Optionally, the commands may be executed using subroutines capable of performing the desired tasks. Examples of typical commands for embodiments of the present invention are collect and process data command, send data command, store data command, execute operational command, and execute combinations of commands.

In other embodiments, sleep step 1200 places the sensor apparatus in sleep mode for a predetermined amount time. The sensor apparatus is returned to normal mode after passage of the predetermined amount of time. An advantage of this embodiment is that the sensor apparatus may remain in sleep mode while waiting until it is time to collect measurements or while waiting between measurements. Consequently, there is less energy wasted while waiting until it is time to collect data or during the time between measurements.

Optionally, the program may loop back to sleep step 1200 after completing handle communications step 1300. In other words, the program puts the sensor apparatus back into sleep mode until another command is received or for a predetermined amount of time. In a preferred embodiment, the program allows a user to select either a command responsive sleep mode or a time responsive sleep mode for operation of the sensor apparatus.

Embodiments of the present invention may also use software programs that do not have sleep step 1200. However, the presence of the sleep step may significantly improve the capabilities of the sensor apparatus. A major advantage resulting from having a sleep step is the improvement in power conservation. The sleep mode greatly reduces the power consumption by the sensor apparatus and extends the total period of time over which the sensor apparatus may be available for use. The sleep mode reduces the rate of power drain for the power source while the sensor apparatus waits for commands. In the normal mode, the sensor apparatus uses power as needed for carrying out the desired commands. As a result of using the sleep mode, more power is available for operating in the normal mode before the power source must be recharged or replaced. In one embodiment, the sleep mode may only require not more than about 30 microwatts: more preferably, not more than about 10 microwatts.

The collect and process data command initiates a sensor scanning sequence so as to collect data from the sensors. The data from the sensors are processed by the information processor, possibly including A/D conversion, to obtain the desired information. The information from the sensors may be processed so that the data can be used in tasks such as developing response models, process control, process characterization, process monitoring, process development, process optimization, process tool development, and process tool optimization.

The information processor may also perform mathematical manipulations of the data received from the sensors. For example, the information processor may perform data reduction calculations such as statistical analysis of the measured data. The mathematical manipulations can allow the sensor apparatus to provide data in the final form or nearly final form desired by the user. For example, rather than transmitting all of the measured data points, it may be sufficient just to transmit the average value and standard deviation.

The send data command causes the program to transmit data from the information processor via the internal communicator to the external communicator. The transmission of data from the sensors can occur as soon as the data becomes available so as to achieve approximately real-time data transmission. Data stored in the information processor may also be transmitted. The stored data may include data generated from the sensor measurements. The stored data may also include data such as calibration factors, identification information for the sensor apparatus, parameters for the data collection, parameters for the mathematical manipulation of the measured data, and identification information for the stored data.

The store data command causes the program to store data in the information processor. Data that are read from the sensors and processed may be stored in memory in the information processor. The data may be stored so that it may be downloaded at a later time. The download may take place while the sensor apparatus is still in the process tool or after the sensor apparatus has been removed from the process tool.

Another action initiated by the store data command may include storing data wirelessly received from the external communicator. Examples of data received from the external communicator that may be stored include data such as calibration factors, parameters for data collection, instructions for data transmission, instructions for data storage, and identification information.

The execute operational command causes the program to perform various types of commands that may be required for the general operation of the sensor apparatus. Examples of possible operational commands include running subroutines for debugging and error checking, running subroutines for calibrating the sensors, and running subroutines for providing the status of one or more components of the sensor apparatus. In a preferred embodiment, the software includes a subroutine for monitoring the power source status so that readings of the remaining power in the power source can be provided to the user.

The execute combinations of commands command causes the program to perform multiple commands or combinations of commands. For example, it may be desirable to store the measured data in addition to transmitting the measured data as soon as the data becomes available.

Clearly, embodiments of the present invention can be used for a wide variety of applications that require data acquisition for development, optimization, monitoring, and control of processes and process tools used for processing workpieces. Capabilities and features of embodiments of the present invention are particularly suited for processing high-value workpieces such as semiconductor wafers and flat panel displays.

One of the most important features of embodiments of the present invention is the capability of substantially autonomous operation. Embodiments of the present invention do not require physical connections for communications nor are external physical connections required for power during data acquisition. Since no wires and no cables are required for operation, there is substantially no opportunity for perturbations of the measurements as a result of wires and cables connected to the sensor apparatus.

Another advantage of the generally wireless operation is that embodiments of the present invention can be loaded into process tools in substantially the same way as that for the workpieces. This means that data collection and response models can be obtained in a substantially non-intrusive manner. Specifically, there is no need to make special connections and no need for special feedthroughs to collect the data. Furthermore, there is no need, generally, to gain access to the interior of the process tool except by the usual methods available for the workpieces. The conditions inside the process tool need not be compromised by having to open the process chamber. If the process chamber is at vacuum, then the vacuum does not need to be broken. Consequently, the process tool can have a higher productivity and a manufacturing facility using the process tool can have higher throughput.

Embodiments of the present invention can provide the capability of obtaining data for response models substantially without major interruptions to the workflow for the process tool. Embodiments of the present invention can be integrated into the operations of a manufacturing facility with greater ease than is usually possible with standard technologies for data collection. Embodiments of the present invention can be incorporated into the routine monitoring and control procedures for manufacturing operations. The data obtained using embodiments of the present invention can be included as part of the statistical process control and statistical quality control protocols used in numerous manufacturing operations.

Embodiments of the present invention include methods and apparatus for increasing the production efficiency of process tools used for processing workpieces.

Embodiments of the present invention include methods and apparatus for increasing the production efficiency of manufacturing facilities that use process tools for processing workpieces.

Embodiments of the present invention include methods and apparatus for reducing the cost of ownership of process tools used for processing workpieces.

Embodiments of the present invention include methods and apparatus for developing new process tools and processes for processing workpieces.

While there have been described and illustrated specific embodiments of the invention, it will be clear that variations in the details of the embodiments specifically illustrated and described may be made without departing from the true spirit and scope of the invention as defined in the appended claims and their legal equivalents.

What is claimed is:

1. A method of deriving operating characteristics for a process tool used for processing workpieces, the method being performed using a sensor apparatus that includes an information processor, embedded executable commands for controlling the apparatus, and at least one sensor, the method comprising the steps of:

a') supporting the sensor and supporting the information processor on the substrate;
a) loading the sensor apparatus into the process tool;
b) measuring the operating characteristics with the sensor apparatus;
c) converting the measured operating characteristics into digital data using the sensor apparatus;
d) performing at least one step of:
  i. storing the digital data in the sensor apparatus, and
  ii. storing the digital data in the sensor apparatus and transmitting the digital data to a receiver.

2. The method of claim 1 further comprising the steps of:
transmitting data wirelessly to the sensor apparatus; and
permitting the sensor apparatus to use or store the information wirelessly transmitted to the sensor apparatus.

3. The method of claim 1 further comprising the step of using the sensor apparatus to perform data reduction calculations on the measured operating characteristics.

4. The method of claim 1 wherein the sensor apparatus comprises a power source and wherein the method of claim 1 further comprises the steps of:
switching the sensor apparatus electronic devices to reduced operation to conserve power while waiting; and
switching the sensor apparatus electronic devices to normal mode after at least one of
  a) a predetermined time,
  b) a predetermined amount of time, and
  c) receiving a command.

5. The method of claim 1 wherein the sensor apparatus comprises a power source; and further comprising the step of wirelessly recharging the power source.

6. The method of claim 1 wherein step a) comprises using a robot to load the sensor apparatus into the process tool.

7. The method of claim 6 further comprising the step of unloading the sensor apparatus from the process tool using the robot.

8. The method of claim 1 wherein the sensor apparatus is approximately the same size as the workpiece so that the sensor apparatus can be loaded into the process tool using a robot used for loading the workpiece.

9. The method of claim of 1 wherein the information processor comprises a microprocessor.

10. A method of deriving operating characteristics for a process tool used for processing workpieces, the method comprising the steps of:
a) loading a sensor apparatus including at least one sensor, electronic devices for information processing and transmitting information, embedded executable commands for controlling the apparatus, and a substrate for supporting the at least one sensor and supporting the electronic devices into the process tool;
b) measuring the operating characteristics with the sensor apparatus;
c) converting the measured operating characteristics into digital data using the sensor apparatus;
d) performing at least one step of:
  i. storing the digital data in the sensor apparatus,
  ii. transmitting the digital data to a receiver, and
  iii. storing the digital data in the sensor apparatus and transmitting the digital data to a receiver, and
e) storing calibration data in the sensor apparatus for use in processing data from the sensors.

11. A method of deriving operating characteristics for a process tool used for processing workpieces, the method comprising the steps of:

a') providing a sensor apparatus having at least one sensor, electronic devices for information processing and transmitting information, and a substrate for supporting the at least one sensor and supporting the electronic devices;

a) loading the sensor apparatus including the electronic devices into the process tool;

b) measuring the operating characteristics with the sensor apparatus;

c) converting the measured operating characteristics into digital data using the sensor apparatus;

d) performing at least one step of:
  i. storing the digital data in the sensor apparatus,
  ii. transmitting the digital data to a receiver, and
  iii. storing the digital data in the sensor apparatus and transmitting the digital data to a receiver, and e) providing sufficient isolation of the sensor apparatus electronic devices to allow the electronic devices to operate in the presence of at least one of electric field, magnetic field, electromagnetic radiation, RF radiation, microwave radiation, temperatures greater than about 100 C., corrosive chemicals, and conditions detrimental to the functioning of the electronic components.

12. An apparatus for acquiring data for process tools used for processing workpieces, the apparatus comprising:
  a substrate;
  at least one sensor supported by the substrate, the sensor being capable of providing information;
  an information processor supported by the substrate, the information processor having embedded software for controlling the apparatus, the information processor being connected with the sensor so as to receive information from the sensor;
  an internal communicator supported by the substrate, the internal communicator being connected with the information processor so that the information processor can provide information to the internal communicator, the internal communicator being capable of transmitting information received from the information processor;
  a power source supported by the substrate, the power source being connected so as to provide power to at least one of:
    i. the information processor,
    ii. the internal communicator, and
    iii. the sensor;
  the information processor being capable of at least one of
    a) storing digital information, and
    b) storing digital information and transmitting digital information to the internal communicator.

13. The apparatus of claim 12 wherein the at least one sensor comprises a plurality of substantially the same type of sensors or a plurality of sensors that include different types of sensors.

14. The apparatus of claim 12 wherein the internal communicator is capable of wirelessly transmitting information to a receiver.

15. The apparatus of claim 14 wherein the connection between the information processor and the internal communicator allows bi-directional information transfer and wherein the internal communicator is capable of wirelessly receiving data.

16. The apparatus of claim 15 wherein the internal communicator is capable of transmitting and receiving information using energy from the electromagnetic spectrum.

17. The apparatus of claim 15 wherein the energy is infrared electromagnetic energy.

18. The apparatus of claim 12 wherein the information processor comprises a microprocessor and a memory, the microprocessor and the memory are connected to allow information transfer.

19. The apparatus of claim 18 wherein the memory comprises random access nonvolatile memory.

20. The apparatus of claim 12 wherein the power source is capable of being recharged wirelessly and the power source comprises a battery or a capacitor.

21. The apparatus of claim 12 wherein the power source comprises a battery and an output voltage regulator, the regulator being connected to the output of the battery so as to provide a substantially constant voltage output for the power source.

22. The apparatus of claim 12 wherein the substrate has a cavity for partially or substantially completely containing at least one of:
  i. the information processor,
  ii. the power source, and
  iii. the internal communicator.

23. The apparatus of claim 22 wherein the substrate is capable of substantially maintaining a vacuum within the cavity.

24. The apparatus of claim 22 further comprising a shield, the shield being capable of substantially isolating at least one of
  i. the information processor,
  ii. the power source, and
  iii. the internal communicator so that the sensor apparatus can operate when exposed to the process conditions.

25. The apparatus of claim 12 wherein the internal communicator is capable of transmitting information to the exterior of the process tool using sound.

26. The apparatus of claim 12 wherein the substrate has dimensions and properties approximately equal to those of the workpiece.

27. The apparatus of claim 12 having an area footprint in the range of greater than 0 percent and not greater than about 20 percent of the area of the workpiece.

28. The apparatus of claim 12 wherein the power source is capable of being recharged wirelessly via magnetic induction and the power source comprises a battery or a capacitor.

29. The apparatus of claim 12 wherein the information processor comprises a microprocessor.

30. The apparatus of claim 12 wherein the substrate comprises a flatpanel display substrate.

31. The apparatus of claim 12 wherein the substrate comprises a glass substrate.

32. The apparatus of claim 12 wherein the substrate comprises materials other than those materials used for the workpieces.

33. An apparatus for acquiring data for process tools used for processing workpieces, the apparatus comprising:
  a substrate;
  at least one sensor supported by the substrate, the sensor being capable of providing information;
  an information processor supported by the substrate, the information processor being connected with the sensor so as to receive information from the sensor;
  an internal communicator supported by the substrate, the internal communicator being connected with the information processor so that the information processor can provide information to the internal communicator, the internal communicator being capable of transmitting information received from the information processor;

a power source supported by the substrate, the power source being connected so as to provide power to at least one of:
   i. the information processor,
   ii. the internal communicator, and
   iii. the sensor;
the information processor being capable of at least one of
   a) storing digital information, and
   b) storing digital information and transmitting digital information to the internal communicator; and
wherein the power source is capable of being recharged wirelessly via magnetic induction.

34. An apparatus for acquiring data for process tools used for processing workpieces, the apparatus comprising:
   a substrate;
   at least one sensor supported by the substrate, the sensor being capable of providing information;
   an information processor supported by the substrate, the information processor being connected with the sensor so as to receive information from the sensor;
   an internal communicator supported by the substrate, the internal communicator being connected with the information processor so that the information processor can provide information to the internal communicator, the internal communicator being capable of transmitting information received from the information processor;
   a power source supported by the substrate, the power source being connected so as to provide power to at least one of:
      i. the information processor,
      ii. the internal communicator, and
      iii. the sensor;
   the information processor being capable of at least one of storing digital information, and
   storing digital information and transmitting digital information to the internal communicator; and
   a shield partially or substantially completely surrounding at least one of the information processor, the power source, and the internal communicator; the shield being capable of at least one of:
      i. allowing the electronic devices to operate under conditions detrimental to the functioning of the electronic devices, and
      ii. substantially preventing exposure of the process tool to contaminants from sensor apparatus.

35. A method of operating a sensor apparatus including at least one sensor, electronic devices for information processing and transmitting information, and a substrate for supporting the at least one sensor and supporting the electronic devices, and embedded software for the method, the method comprising the steps of:
   a) initializing the sensor apparatus;
   a') causing the sensor apparatus to enter a sleep mode until at least one of
      i. a predetermined time,
      ii. a predetermined amount of time, and
      iii. receiving a command; and
   b) causing the sensor apparatus to do at least one step of
      i. collecting and processing data,
      ii. sending data to a receiver,
      iii. storing data, and
      iv. executing an operational command.

36. The method of claim 35 wherein the method loops back to the step of entering the sleep mode after completing step b).

37. The method of claim 35 further comprising the step of storing calibration data in the sensor apparatus.

38. The method of claim 35 further comprising the step of monitoring the level of power of a power source for the sensor apparatus.

39. A method of operating a manufacturing facility for processing workpieces, the method comprising the steps of:
   a) providing at least one process tool capable of processing workpieces, wherein the process tool is part of the manufacturing facility;
   b) providing a sensor apparatus having embedded software for controlling the sensor apparatus, at least one sensor, electronic devices for information processing and transmitting information, and a substrate for supporting the at least one sensor and supporting the electronic devices, wherein the sensor apparatus is capable of collecting and wirelessly transmitting or storing data from within the process tool;
   c) measuring process data for the process tool using the sensor apparatus;
   d) performing at least one step of
      i. monitoring the performance of the process tool using data from the sensor apparatus, and
      ii. maintaining the performance of the process tool in response to the data from the sensor apparatus.

40. The method of claim 39 wherein the workpieces comprise substrates for flatpanel displays.

41. An apparatus for acquiring data for a process tool used for processing workpieces, the apparatus comprising:
   a substrate;
   at least one sensor supported by the substrate, the sensor being capable of providing information;
   an information processor supported by the substrate, the information processor having embedded software for controlling the apparatus, the information processor being connected with the sensor so as to receive information from the sensor;
   an internal communicator supported by the substrate, the internal communicator being connected with the information processor so that the information processor can provide information to the internal communicator, the internal communicator being capable of transmitting information received from the information processor;
   a power source supported by the substrate, the power source being connected so as to provide power to at least one of:
      i. the information processor,
      ii. the internal communicator, and
      iii. the sensor;
   the sensor apparatus being capable of storing digital information and transmitting digital information from within the process tool.

* * * * *